(12) United States Patent
Jang et al.

(10) Patent No.: US 11,903,040 B2
(45) Date of Patent: Feb. 13, 2024

(54) METHOD AND APPARATUS FOR COMMUNICATION ESTABLISHMENT FOR WIRELESS POWER TRANSFER

(71) Applicants: HYUNDAI MOTOR COMPANY, Seoul (KR); KIA MOTORS CORPORATION, Seoul (KR)

(72) Inventors: Jin Su Jang, Hwaseong-si (KR); Zeung Il Kim, Hwaseong-si (KR); Taek Hyun Jung, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 487 days.

(21) Appl. No.: 17/082,527

(22) Filed: Oct. 28, 2020

(65) Prior Publication Data

US 2021/0136842 A1    May 6, 2021

(30) Foreign Application Priority Data

Oct. 31, 2019  (KR) .................. 10-2019-0138023
Sep. 16, 2020  (KR) .................. 10-2020-0119075

(51) Int. Cl.
*H02J 50/80* (2016.01)
*B60L 53/126* (2019.01)
(Continued)

(52) U.S. Cl.
CPC .......... *H04W 76/10* (2018.02); *B60L 53/126* (2019.02); *B60L 53/66* (2019.02); *H02J 50/40* (2016.02);
(Continued)

(58) Field of Classification Search
CPC ....... H04W 76/10; H04W 84/12; H02J 50/80; H02J 50/40; H02J 50/12; H02J 50/70;
(Continued)

(56) References Cited

U.S. PATENT DOCUMENTS

2015/0015419 A1* 1/2015 Halker .................. B60L 53/122
 320/108
2015/0042168 A1* 2/2015 Widmer ................ B60L 53/126
 307/104

(Continued)

FOREIGN PATENT DOCUMENTS

EP  2958345 A1  12/2015
EP  3315351 A2   5/2018

OTHER PUBLICATIONS

S. Li and C. C. Mi, "Wireless Power Transfer for Electric Vehicle Applications," in IEEE Journal of Emerging and Selected Topics in Power Electronics, vol. 3, No. 1, pp. 4-17, Mar. 2015, doi: 10.1109/JESTPE.2014.2319453. (Year: 2015).*

(Continued)

*Primary Examiner* — Harun Chowdhury
(74) *Attorney, Agent, or Firm* — Fox Rothschild LLP (57) ABSTRACT

A connection establishment method, performed by an electric vehicle (EV) being supplied power from a power supply device, may include scanning beacon broadcast in a low-level communication scheme from a plurality of chargers; selecting a beacon signal having a minimum signal attenuation by calculating signal attenuations for a plurality of scanned beacon signals; and establishing a communication connection with an electric vehicle supply equipment (EVSE) associated with a charger transmitting the beacon signal having the minimum signal attenuation.

16 Claims, 9 Drawing Sheets

(51) Int. Cl.
*H04W 76/10* (2018.01)
*H02J 50/40* (2016.01)
*B60L 53/66* (2019.01)
*H04B 5/00* (2006.01)
*B60K 6/28* (2007.10)
*H04W 84/12* (2009.01)

(52) U.S. Cl.
CPC ............ *H02J 50/80* (2016.02); *H04B 5/0037* (2013.01); *B60K 6/28* (2013.01); *B60Y 2200/91* (2013.01); *B60Y 2200/92* (2013.01); *B60Y 2300/91* (2013.01); *H04W 84/12* (2013.01)

(58) Field of Classification Search
CPC ........ H02J 50/90; B60L 53/126; B60L 53/66; B60L 53/36; B60L 53/124; B60K 6/28; B60Y 2200/91; B60Y 2200/92; B60Y 2300/91; H04B 5/0037
USPC .......................... 370/252, 254, 329; 307/104
See application file for complete search history.

(56) References Cited

U.S. PATENT DOCUMENTS

| | | | |
|---|---|---|---|
| 2016/0023557 A1* | 1/2016 | Dimke | B60L 53/126 320/108 |
| 2016/0059725 A1 | 3/2016 | Kim | |
| 2016/0075242 A1 | 3/2016 | Kim et al. | |
| 2018/0241301 A1* | 8/2018 | Nagaoka | H02M 1/14 |
| 2019/0023140 A1 | 1/2019 | Kim et al. | |
| 2019/0283616 A1* | 9/2019 | Upward | H02J 50/80 |
| 2022/0217654 A1* | 7/2022 | Kang | H04W 52/242 |

OTHER PUBLICATIONS

C. Qiu, K. T. Chau, C. Liu and C. C. Chan, "Overview of wireless power transfer for electric vehicle charging," 2013 World Electric Vehicle Symposium and Exhibition (EVS27), 2013, pp. 1-9, doi: 10.1109/EVS.2013.6914731. (Year: 2013).*

* cited by examiner

| Message Name | Signal Name | Size (bit) | Value | Definition |
|---|---|---|---|---|
| LLC Beacon (Broadcast) | APPLICATION_TYPE | 2 | 0x00 | EV – EVSE Communication Matching |
| | | | 0x01 | EV – EVSE Alignment |
| | | | 0x02 ~ 0x03 | Reserved |
| | SENSOR_TYPE | 3 | 0x00 | LF Antenna |
| | | | 0x01 | MV |
| | | | 0x02 | LPE |
| | | | 0x03 | UWB |
| | | | 0x04 ~ 0x07 | Reserved |
| | SSID | 32 | variable | Service Set IDentifier |
| | PID | 8 | variable | PAD IDentifier |
| | RANDOM_VALUE | 16 | variable | Random value |

METHOD AND APPARATUS FOR COMMUNICATION ESTABLISHMENT FOR WIRELESS POWER TRANSFER

CROSS-REFERENCE TO RELATED APPLICATION

The present application claims priority to and the benefit of Korean Patent Application No. 10-2019-0138023, filed on Oct. 31, 2019, and Korean Patent Application No. 10-2020-0119075, filed on Sep. 16, 2020, the entire contents of which are incorporated herein by reference.

TECHNICAL FIELD

The present disclosure relates to a method and an apparatus for communication establishment for wireless power transfer (WPT), and more specifically, to a communication establishment method performed by an electric vehicle (EV) in a situation where a plurality of charger coexist, and a communication establishment apparatus for the EV using the method.

BACKGROUND

Recently developed electric vehicles (EV) drive a motor with power of a battery, have fewer sources of air pollution, such as exhaust gas and noise, compared to conventional gasoline engine vehicles, and have advantages of fewer breakdowns, longer life, and simple driving operations. The EVs are classified into hybrid electric vehicles (HEVs), plug-in hybrid electric vehicles (PHEVs), and electric vehicles (EVs) according to their driving sources. The HEV has an engine as a main power and a motor as an auxiliary power. The PHEV has a motor that is a main power and an engine that is used when a battery is discharged. The EV has a motor, but no engine.

During charging, it is general for a vehicle to enter a charging station, connect to a charger through a wireless local area network (WLAN), and perform charging. In this case, in a charging station where multiple chargers coexist, a problem may occur in that the vehicle may communicate with a charger other than a charger that is to actually perform power transfer to the EV.

SUMMARY

The present disclosure provides a communication establishment method performed by an EV receiving a power from a power supply device. The present disclosure also provides a communication establishment apparatus of an EV using the communication establishment method.

According to exemplary embodiments of the present disclosure, a connection establishment method, performed by an EV being supplied power from a power supply device, may comprise: scanning beacons broadcast in a low-level communication scheme from a plurality of chargers; selecting a beacon signal having a minimum signal attenuation by calculating signal attenuations for a plurality of scanned beacon signals; and establishing a communication connection with an electric vehicle supply equipment (EVSE) associated with a charger transmitting the beacon signal having the minimum signal attenuation.

The low-level communication scheme may include a communication scheme using one or more among a low power excitation (LPE), a magnetic vectoring (MV), and a low frequency (LF) antenna.

The beacon broadcast in the low-level communication scheme may include at least one of an application type indicating an application to which the beacon is applied, a sensor type indicating a type of a sensor implementing the low-level communication scheme, a service set identifier (SSID), and a pad identifier.

The application type may indicate one of a communication matching between EV and EVSE, and an alignment between EV and EVSE.

The sensor type may include at least one of an LF antenna, an MV, an LPE, and an ultra-wide band (UWB).

The selecting of the beacon signal may be repeatedly performed until a signal attenuation for a beacon signal transmitted by a currently-associated charger is equal to or less than a signal attenuation for a beacon signal transmitted by another charger, and a position alignment is completed.

The establishing of the communication connection may include: transmitting a probe request to the EVSE associated with the charger transmitting the beacon signal having the minimum signal attenuation, and receiving a probe response in response to the probe request; and transmitting an association request to the EVSE associated with the charger transmitting the beacon signal having the minimum signal attenuation, and receiving an association response in response to the association request.

The establishing of the communication connection may include: receiving a wireless local area network (WLAN) beacon broadcast by the EVSE associated with the charger transmitting the beacon signal having the minimum signal attenuation; and transmitting an association request to the EVSE based on information included in the WLAN beacon broadcast by the EVSE, and receiving an association response in response to the association request.

Furthermore, according to exemplary embodiments of the present disclosure, a communication establishment apparatus of an EV being supplied power from a power supply device may comprise a processor; and a memory storing at least one instruction executable by the processor, wherein when executed by the processor, the at least one instruction may cause the processor to: scan beacons broadcast in a low-level communication scheme from a plurality of chargers; select a beacon signal having a minimum signal attenuation by calculating signal attenuations for a plurality of scanned beacon signals; and establish a communication connection with an electric vehicle supply equipment (EVSE) associated with a charger transmitting the beacon signal having the minimum signal attenuation.

The low-level communication scheme may include a communication scheme using one or more among a low power excitation (LPE), a magnetic vectoring (MV), and a low frequency (LF) antenna.

The beacon broadcast in the low-level communication scheme may include at least one of an application type indicating an application to which the beacon is applied, a sensor type indicating a type of a sensor implementing the low-level communication scheme, a service set identifier (SSID), and a pad identifier.

The application type may indicate one of a communication matching between EV and EVSE, and an alignment between EV and EVSE.

The sensor type may include at least one of an LF antenna, an MV, an LPE, and an ultra-wide band (UWB).

The selecting of the beacon signal may be repeatedly performed until a signal attenuation for a beacon signal transmitted by a currently-associated charger is equal to or less than a signal attenuation for a beacon signal transmitted by another charger, and a position alignment is completed.

In the establishing of the communication connection, the at least one instruction may further cause the processor to: transmit a probe request to the EVSE associated with the charger transmitting the beacon signal having the minimum signal attenuation, and receive a probe response in response to the probe request; and transmit an association request to the EVSE associated with the charger transmitting the beacon signal having the minimum signal attenuation, and receive an association response in response to the association request.

In the establishing of the communication connection, the at least one instruction may further cause the processor to: receive a wireless local area network (WLAN) beacon broadcast by the EVSE associated with the charger transmitting the beacon signal having the minimum signal attenuation; and transmit an association request to the EVSE based on information included in the WLAN beacon broadcast by the EVSE, and receive an association response in response to the association request.

According to the exemplary embodiments of the present disclosure, a vehicle can be automatically connected to a charger to perform power transfer at a charging station where one or more chargers coexist. According to the exemplary embodiments of the present disclosure, since a position alignment sensor of the wireless charging transmission/reception pad is used, a separate additional hardware configuration may be unnecessary.

DRAWINGS

The present disclosure will become more apparent by describing in detail exemplary embodiments of the present disclosure with reference to the accompanying drawings, in which.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05% or 0.01% of the stated value. Unless otherwise clear from the context, all numerical values provided herein are modified by the term "about."

Exemplary embodiments of the present disclosure are disclosed herein. However, specific structural and functional details disclosed herein are merely representative for purposes of describing exemplary embodiments of the present disclosure; however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, the component may be directly or indirectly connected to the other component. In other words, for example, intervening components may be present. On the contrary, when a component is referred to as being "directly connected to" another component, there are no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. Terms defined in dictionaries generally used are interpreted as including meanings identical to contextual meanings of the related art, unless definitely defined otherwise in the present specification, are not interpreted as being ideal or excessively formal meanings.

Additionally, one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, the below methods may be executed by an apparatus comprising the controller in conjunction with one or more other components, as would be appreciated by a person of ordinary skill in the art.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

According to exemplary embodiments of the present disclosure, an EV charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Additional terms used in the present specification are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads.

The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An EV that recharges the on-vehicle primary battery by connecting to the power grid.

"Plug-in vehicle (PV)": An electric vehicle rechargeable via wireless charging from an electric vehicle supply equipment (EVSE) without using a physical plug or a physical socket.

"Heavy duty vehicle (H.D. Vehicle)": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically via a two-part loosely coupled transformer.

"Wireless power transfer (WPT)": The transfer of electrical power from the alternating current (AC) supply network to the electric vehicle without contact.

"Utility": A set of systems which supply electrical energy and may include a customer information system (CIS), an advanced metering infrastructure (AMI), rates and revenue system, etc. The utility may provide the EV with energy based on a rates table and discrete events. Additionally, the utility may provide information about certification of EVs, interval of power consumption measurements, and a tariff.

"Smart charging": A system in which EVSE and/or PEV communicate with power grid to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that may transfer power. The automatic charging may be performed after obtaining necessary authentication and right.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side including the GA Coil, a power/frequency conversion unit and GA controller as well as the wiring from the grid and between each unit, filtering circuits, at least one housing, etc., necessary to function as the power source of a wireless power charging system. The GA may include the communication elements necessary for communication between the GA and the VA.

"Vehicle assembly (VA)": An assembly on the vehicle including the VA Coil, rectifier/power conversion unit and VA controller as well as the wiring to the vehicle batteries and between each unit, filtering circuits, at least one housing, etc., necessary to function as the vehicle part of a wireless power charging system. The VA may include the communication elements necessary for communication between the VA and the GA. The GA may be referred to as a supply device, a power supply side device, or the like, and the VA may be referred to as an EV device, an EV side device, or the like.

"Supply device": An apparatus which provides the contactless coupling to the EV device. In other words, the supply device may be an apparatus external to an EV. When the EV is receiving power, the supply device may operate as the source of the power to be transferred. The supply device may include the housing and all covers.

"EV device": An apparatus mounted on the EV which provides the contactless coupling to the supply device. In other words, the EV device may be installed within the EV. When the EV is receiving power, the EV device may transfer the power from the primary battery to the EV. The EV device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to adjust an output power level. The GA controller may be referred to as a supply power circuit (SPC), and the VA controller may be referred to as an electric vehicle (EV) power circuit (EVPC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure. The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized when a fault occurs.

"Hazardous live component": A live component, which under certain conditions may generate a harmful electric shock.

"Live component": Any conductor or conductive component intended to be electrically energized in normal use.

"Direct contact": Contact of persons with live components. (See, IEC 61440.)

"Indirect contact": Contact of persons with exposed, conductive, and energized components made live by an insulation failure. (See, IEC 61140.)

"Alignment": A process of finding the relative position of supply device to EV device and/or finding the relative position of EV device to supply device for the efficient power transfer that is specified. In the present disclosure, the alignment may direct to a fine positioning of the wireless power transfer system.

"Pairing": A process by which a vehicle is correlated with a dedicated supply device, at which the vehicle is located and from which the power will be transferred. Pairing may include the process by which a VA controller and a GA controller of a charging spot are correlated. The correlation/association process may include the process of association of a relationship between two peer communication entities.

"High-level communication (HLC)": HLC is a special type of digital communication. HLC is necessary for additional services which are not covered by command and control communication. The data link of the HLC may use a power line communication (PLC), but the data link of the HLC is not limited to the PLC.

"Low-power excitation (LPE)": LPE refers to a technique of activating the supply device for the fine positioning and pairing so that the EV may detect the supply device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN may use the same SSID. Devices that do not use a unique SSID are not able to join the BSS. Since the SSID is shown as plain text, the SSID may not provide any security features to the network.

"Extended service set identifier (ESSID)": ESSID is the name of the network to which one desires to connect. ESSID is similar to SSID but a more extended concept.

"Basic service set identifier (BSSID)": BSSID consisting of 48 bits is used to distinguish a specific BSS. With an infrastructure BSS network, the BSSID may be configured for medium access control (MAC) of the AP equipment. For an independent BSS or ad hoc network, the BSSID may be generated with any value.

The charging station may include at least one GA and at least one GA controller configured to manage the at least one GA. The GA may include at least one wireless communication device. The charging station may refer to a place or location having at least one GA, which is installed in home, office, public place, road, parking area, etc.

In the present specification, 'association' may be used as a term to denote a procedure for establishing wireless communication between the EVCC and the SECC controlling the charging infrastructure. Hereinafter, preferred exemplary embodiments of the present disclosure will be described in detail with reference to the accompanying drawings.

Figure 1:
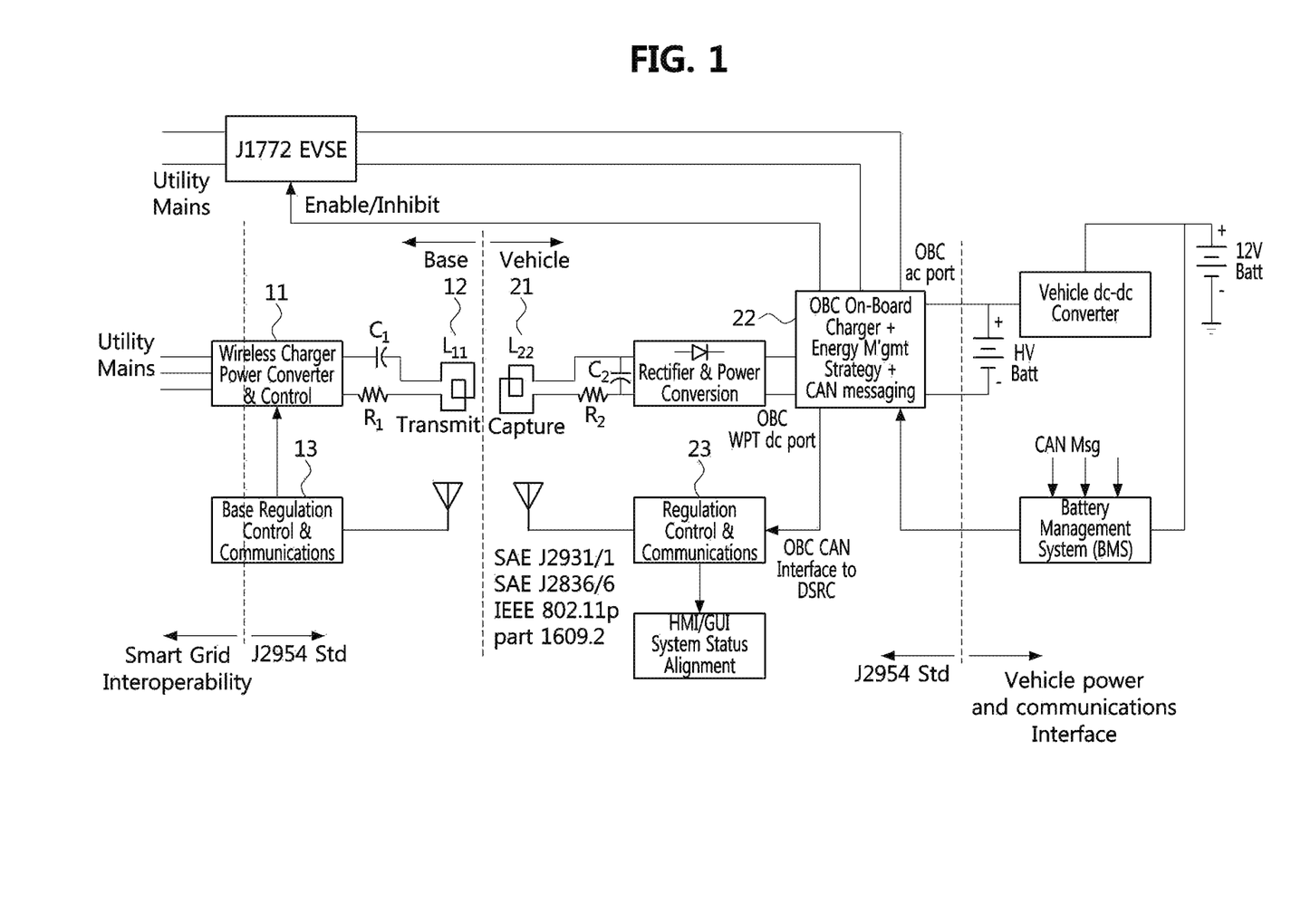
FIG. 1 is a conceptual diagram illustrating an example of a WPT system.

FIG. 1 is a conceptual diagram illustrating an example of a WPT system.

As shown in FIG. 1, an EV charging system may include a conductive charging system using a cable or a non-contact WPT system, but is not limited thereto. The EV charging system may be basically defined as a system that charges a battery mounted in an EV by using a power of a commercial power grid or energy storage device. Such the EV charging system may have various forms according to the type of EVs.

The representative standard for wireless charging, Society of Automotive Engineers (SAE) TIR J2954, establishes an industry standard specification guideline that define interoperability, electromagnetic compatibility, minimum performance, safety, and acceptance criteria for wireless charging of light duty EVs and plug-in EVs.

Referring to FIG. 1 showing an example of a wireless charging system, a wireless communication system (WCS) according to the J2954 standard may include utility interface, high frequency power inverter, coupling coils, rectifier, filter, optional regulator, and communications connected between a vehicle energy charging/storing system and the power inverter connected to the utility. The utility interface may be similar to a conventional EVSE connection to single or three-phase AC power.

Figure 2:
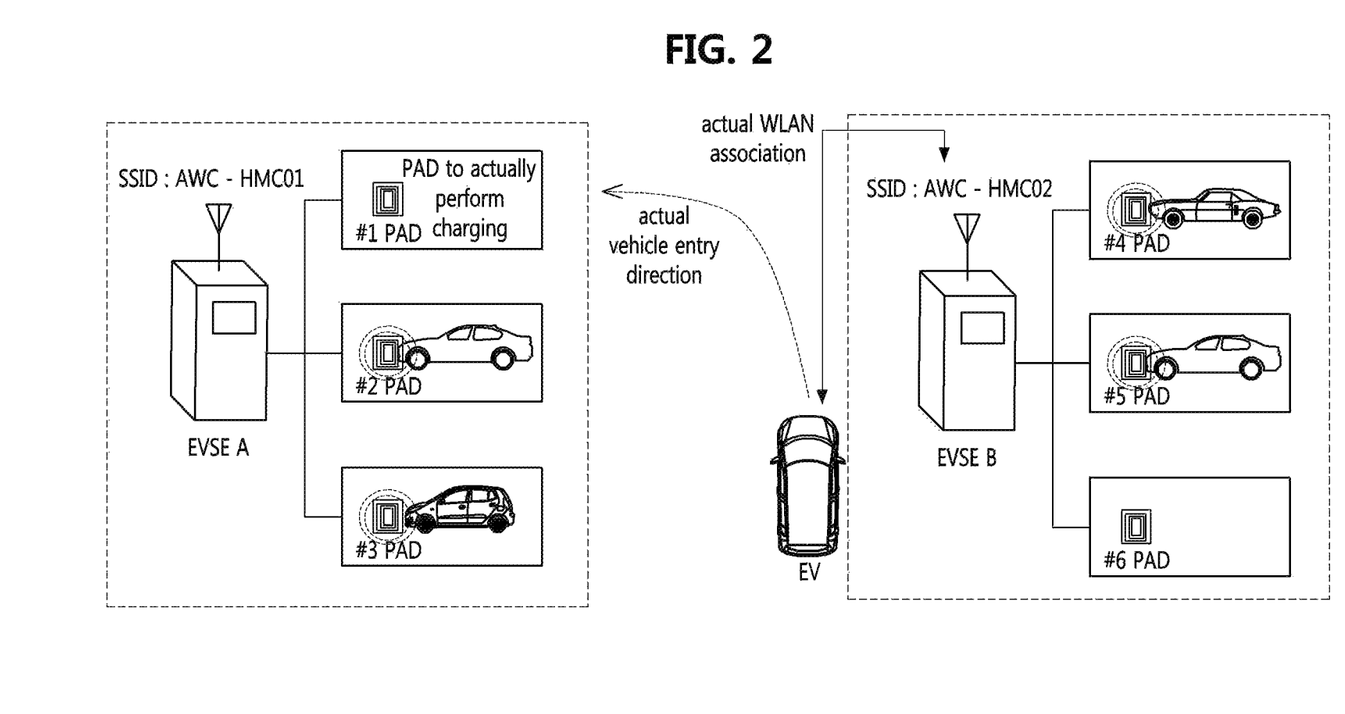
FIG. 2 is a diagram illustrating a typical wireless communication establishment between an EV and a charging infrastructure for power transfer.

The wireless charging system for EVs may be largely classified into the following three groups.
1) GA coil 12 for power transfer, power converter 11 for grid connection, communication link 13 with a vehicle system
2) VA coil 21 having rectifying and filtering components, charging control power electronics 22 required for regulation/safety/shutdown when necessary, and communication link 23 with a base station side.
3) Secondary energy storage system, battery management system components, and related modules required for in-vehicle communication (e.g., CAN, LIN) required for battery SOC, charge rate, and other necessary information FIG. 2 is a diagram illustrating a typical wireless communication establishment between an EV and a charging infrastructure for power transfer.

In the present specification, 'association' may be used as a term to denote a procedure for establishing wireless communication between the EVCC and the SECC controlling the charging infrastructure. In general, when an EV is required to be charged, the EV enters a charging station, connects to a charger to perform power transfer through a wireless LAN (WLAN) such as IEEE 802.11n, and then perform charging. However, if it is connected to a general access point (AP) other than the charger that is to actually perform the power transfer, the charging procedure cannot be normally performed. Therefore, an international electric vehicle charging standard (e.g., international organization for standardization (ISO) 15118) defines that the vehicle can be connected to the charger AP, not the general AP, through a vendor specific element (VSE) field of a MAC frame corresponding to a layer 2 among 7 layers according to the open systems interconnection (OSI) reference model.

However, as shown in FIG. 2, in a charging station where a plurality of chargers coexist, the problem that the vehicle may communicate with a charger other than the charger actually performing power transfer cannot be solved. For example, referring to FIG. 2, in order for the vehicle to charge in a PAD #1, it is necessary to establish a communication connection with a charger A (i.e., EVSE A). However, when the vehicle enters the charging station and performs an association procedure with a charger based on a received signal strength (RSSI) through WLAN, it may be connected to a charger B (i.e., EVSE B) that is physically close to the vehicle, and accordingly, the charging through the PAD #1 may become impossible.

In this reason, the present disclosure proposes a method in which a vehicle is actually associated with a charger to actually perform power transfer at a charging station where two or more chargers coexist.

In the EV wireless communication defined in ISO 15118 among EV-related international standards, charging may be performed after the vehicle (station) and the charger (AP) are associated using WLAN (e.g., 802.11n) and they exchange application messages. In case of a wireless charging vehicle, if a transmission pad (PAD) of the charger is not properly aligned with the vehicle, charging efficiency decreases or charging becomes impossible.

In order to solve this problem, a position alignment method based on low power excitation (LPE), magnetic vectoring (MV), low frequency (LF) antennas, or the like has been proposed. In particular, in the position alignment method using the MV and LF antennas, since a transmission and reception distance of signals is 10 m or more, a low-level communication (LLC) between the vehicle and the charger is possible at the charging station.

Here, an LF signal is a digitally modulated magnetic field operating in an ITU radio band of very low and low frequencies. An LF sensor may operate at a fixed frequency within a frequency range of 19 kHz to 300 kHz. Further, the LF magnetic field may be generated by an antenna located on the EV or an antenna located on the transmission pad.

In case of an automatic association using LF antennas, which is one of the method for position alignment between the charger and the vehicle, each charger in the charging station where a plurality of chargers exist may broadcast information including its own SSID (hereinafter referred to as 'LF beacon') through an LF antenna of a transmission pad (PAD).

The vehicle may identify the information included in the LF beacon broadcast by each charger, select a charger having an LF beacon having the smallest signal attenuation, and perform an association procedure with the corresponding charger by using the WLAN (e.g., IEEE802.11n) through active scanning or passive scanning.

However, as shown in FIG. 2, although the vehicle attempts to charge at the PAD #1 of the charger A (i.e., EVSE A), since a distance to the charger B (i.e., EVSE B) and the PAD #6 is close when entering the charging station, it may be associated with the charger B.

As the vehicle moves closer to the PAD #1 of the charger A, signal attenuation of the LF beacon received from the PAD #1 becomes the smallest, so that the vehicle disconnects the communication connection with the charger B and attempts to associate with the charger A of the PAD #1 which is closest to the vehicle.

After the association process is completed, the position alignment and charging process may be performed while maintaining the connection as long as the connection is not deviated from the PAD #1 area. In addition to the example shown in FIG. 2, various situations may exist according to a layout of the charging station. However, since an LF beacon signal having the smallest signal attenuation among LF beacons received by the vehicle may be a signal received from a pad of a charger physically closest to the vehicle (i.e., charger to actually perform power transfer), the exemplary embodiments of the present disclosure can be applied regardless of the layout of the charging station.

Figure 3:
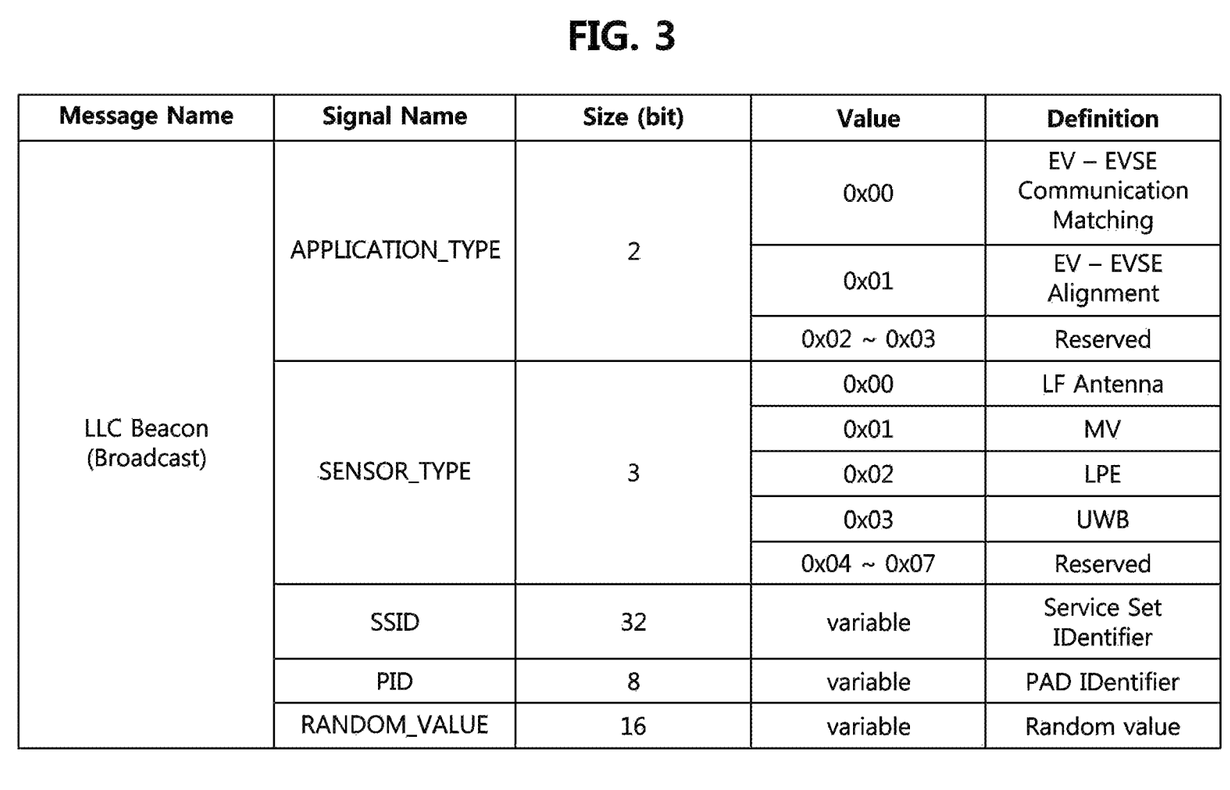
FIG. 3 illustrates information on a beacon message of an LF signal applied to exemplary embodiments of the present disclosure.

FIG. 3 illustrates information on a beacon message of an LF signal applied to exemplary embodiments of the present disclosure.

Through a table shown in FIG. 3, it may be possible to confirm a definition of a low level communication (i.e., LF)

based beacon message for automatic association. Referring to FIG. 3, an LLC (i.e., LF) beacon message may include signals related to an application type (i.e., APPLICATION_TYPE), a sensor type (i.e., SENSOR_TYPE), an SSID, and a PAD identifier (PID).

The application type may indicate an application such as 'EV-EVSE communication matching', 'EV-EVSE alignment', or the like, and may be expressed as a value of 2 bits. The sensor type may be information indicating a sensor type among LF antenna, MV, LPE, ultra-wide band (UWB), etc., and may be expressed as a value of 3 bits.

When there are multiple types of sensors broadcasting LLC beacons in the charging station, the vehicle may preferentially connect sensors that the vehicle supports. When the vehicle also supports multiple sensors, the priority for association may be made in the order in which the sensor's detection range is short. For example, the association may be performed in the order of LPE, MV, and LF antennas.

Figure 4A:
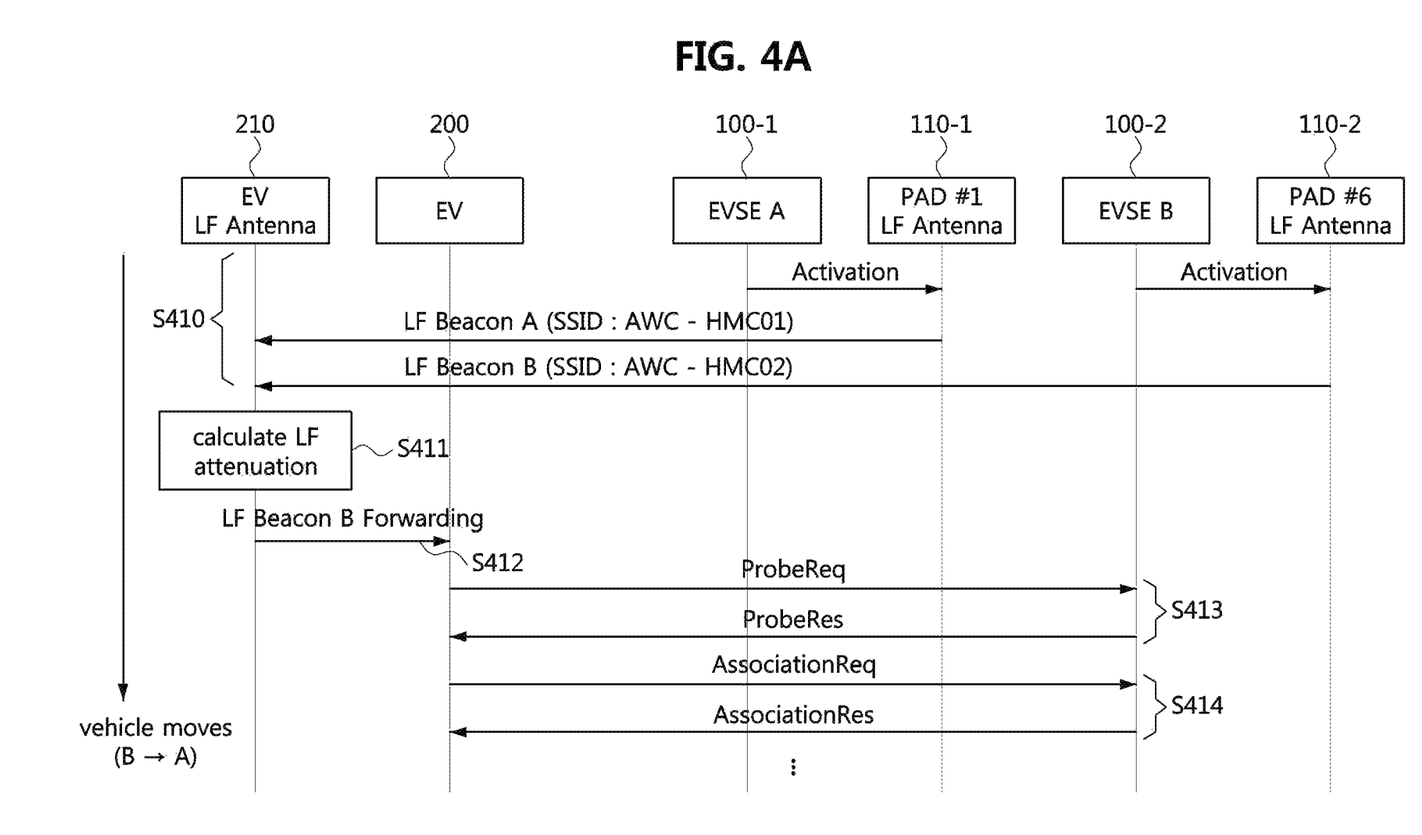
FIGS. 4A and 4B are sequence charts illustrating a communication establishment method between a vehicle and a charger according to an exemplary embodiment of the present disclosure.
Figure 4B:
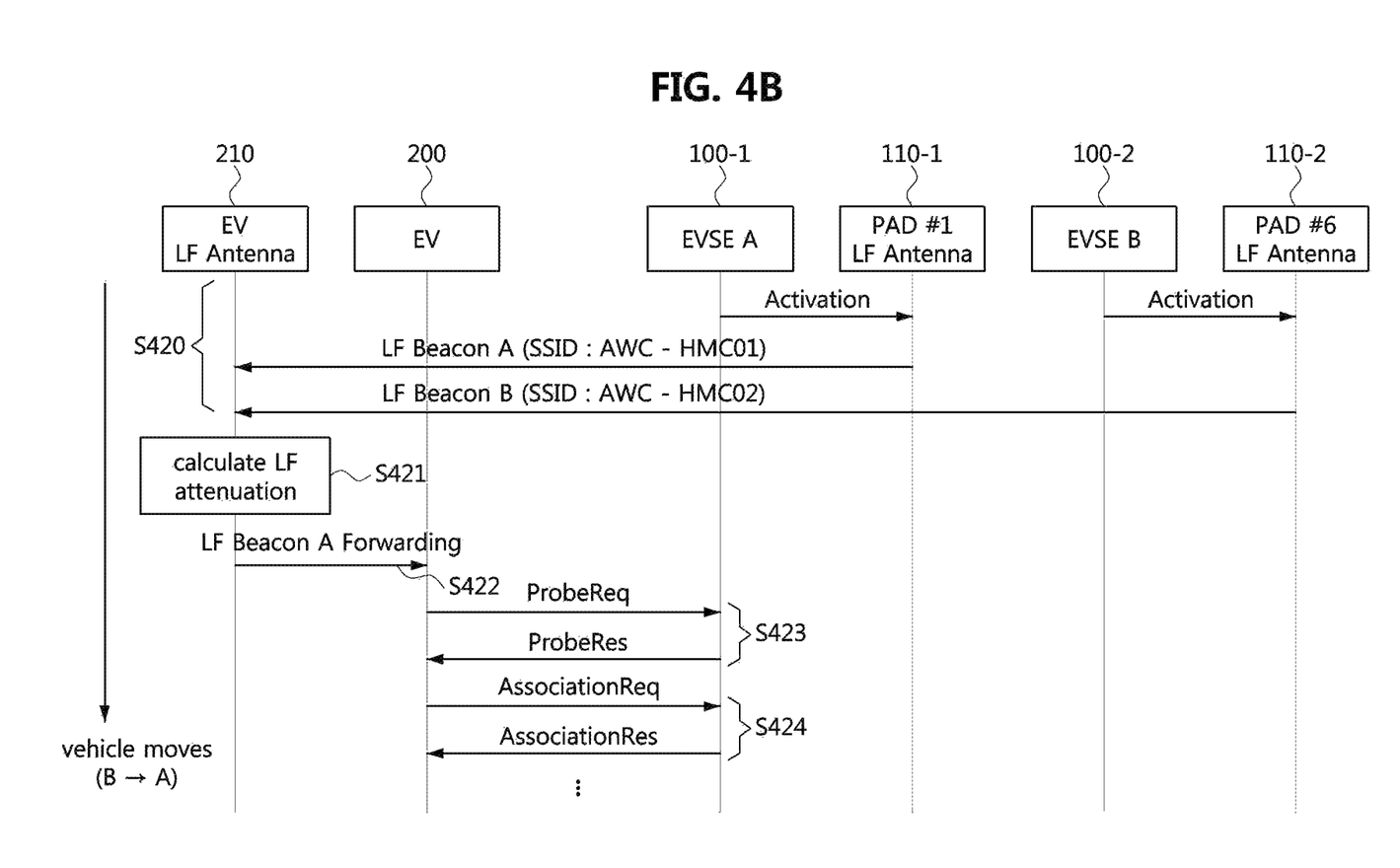

FIGS. 4A and 4B are sequence charts illustrating a communication establishment method between a vehicle and a charger according to an exemplary embodiment of the present disclosure.

FIGS. 4A and 4B shows a case where an association procedure between a vehicle and a charger is performed by active scanning of a WLAN. In addition, it is assumed that the vehicle uses an LF antenna and that an LF beacon signal is periodically broadcast like an AP beacon.

For example, as in the charging station situation described in FIG. 2, assuming that the vehicle 200 is moving, and the PADs #1 and #6 among six transmission pads controlled by the EVSE A 100-1 and the EVSE B 100-2 are not in a charging state, the PADs #1 and #6 may be pads valid for the vehicle entering for charging. Assuming that the PAD #1 is controlled by the EVSE A and the PAD #6 is controlled by the EVSE B, the EVSE A and EVSE B, which detect that the vehicle enters the charging station, may activate an LF antenna 110-1 on the PAD #1 and an LF antenna 110-2 on the PAD #6, respectively. The LF antenna 110-1 on the PAD #1 may broadcast an LF beacon A, and the LF antenna 110-2 on the PAD #6 may broadcast an LF beacon B (S410). In this case, the LF beacon A may include 'AWC-HMC01' as an SSID, and the LF beacon B may include 'AWC-HMC02' as an SSID. That is, the LF beacon A and the LF beacon B may be generated and transmitted by different EVSEs.

An LF antenna 210 of the EV having received the two LF beacons may calculate an LF attenuation value of each LF beacon (S411). Since the vehicle at this time is located close to the PAD #6, the LF attenuation value of the LF beacon A, which is calculated at the LF antenna 210 of the EV, may be greater than the attenuation value of the LF beacon B. Accordingly, the LF antenna 210 of the EV may forward information on the LF beacon B to the EV (S412).

The EV may receive the information on the LF beacon B from the LF antenna 210, transmit a probe request (i.e., ProbeReq) and an association request (i.e., AssociationReq) for association with the EVSE B controlling the PAD #6 that transmitted the LF beacon B, receive responses (i.e., ProbeRes, AssociationRes) from the EVSE B, and establish a connection with the EVSE B (S413, S414).

Meanwhile, as the vehicle moves from the PAD #6 to the PAD #1, the LF antenna 210 of the EV may receive again the LF beacon A broadcasted by the LF antenna 110-1 on the PAD #1 and the LF beacon B broadcast by the LF antenna 110-2 on the PAD #6 (S420). The LF antenna 210 of the EV having received the two LF beacons may calculate an LF attenuation value for each LF beacon (S421). Since the vehicle at this time is located close to the PAD #1, the LF attenuation value of the LF beacon B, which is calculated at the LF antenna 210 of the EV, may be greater than the attenuation value of the LF beacon A. Accordingly, the LF antenna 210 of the EV may forward information on the LF beacon A to the EV (S422).

The EV may receive the information on the LF beacon A from the LF antenna 210, transmit a probe request (i.e., ProbeReq) and an association request (i.e., AssociationReq) for association with the EVSE A controlling the PAD #1 that transmitted the LF beacon A, receive responses (i.e., ProbeRes, AssociationRes) from the EVSE A, and establish a connection with the EVSE A (S423, S424).

Figure 5A:
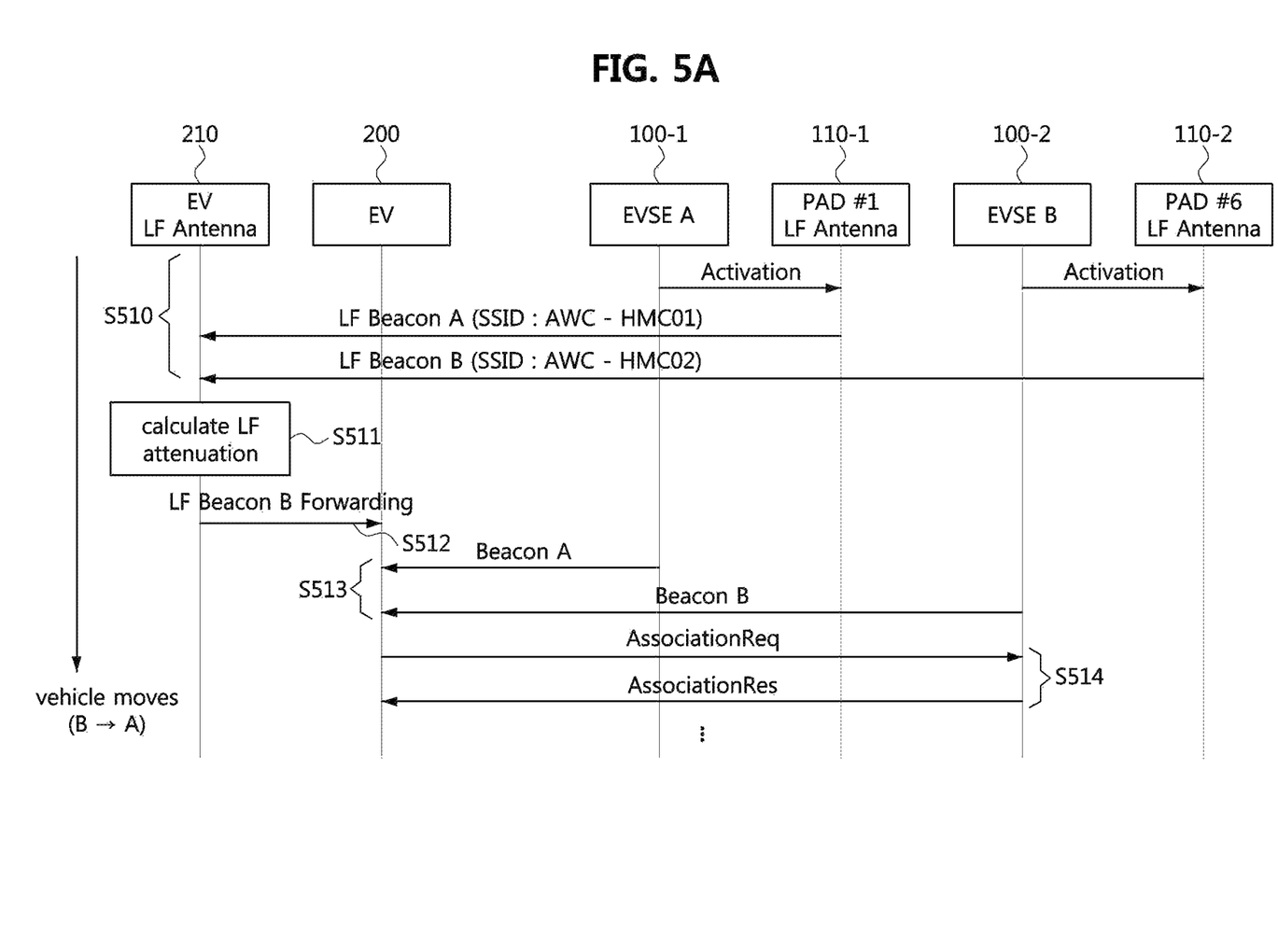
FIGS. 5A and 5B are sequence charts illustrating a communication association method between a vehicle and a charger according to another exemplary embodiment of the present disclosure.
Figure 5B:
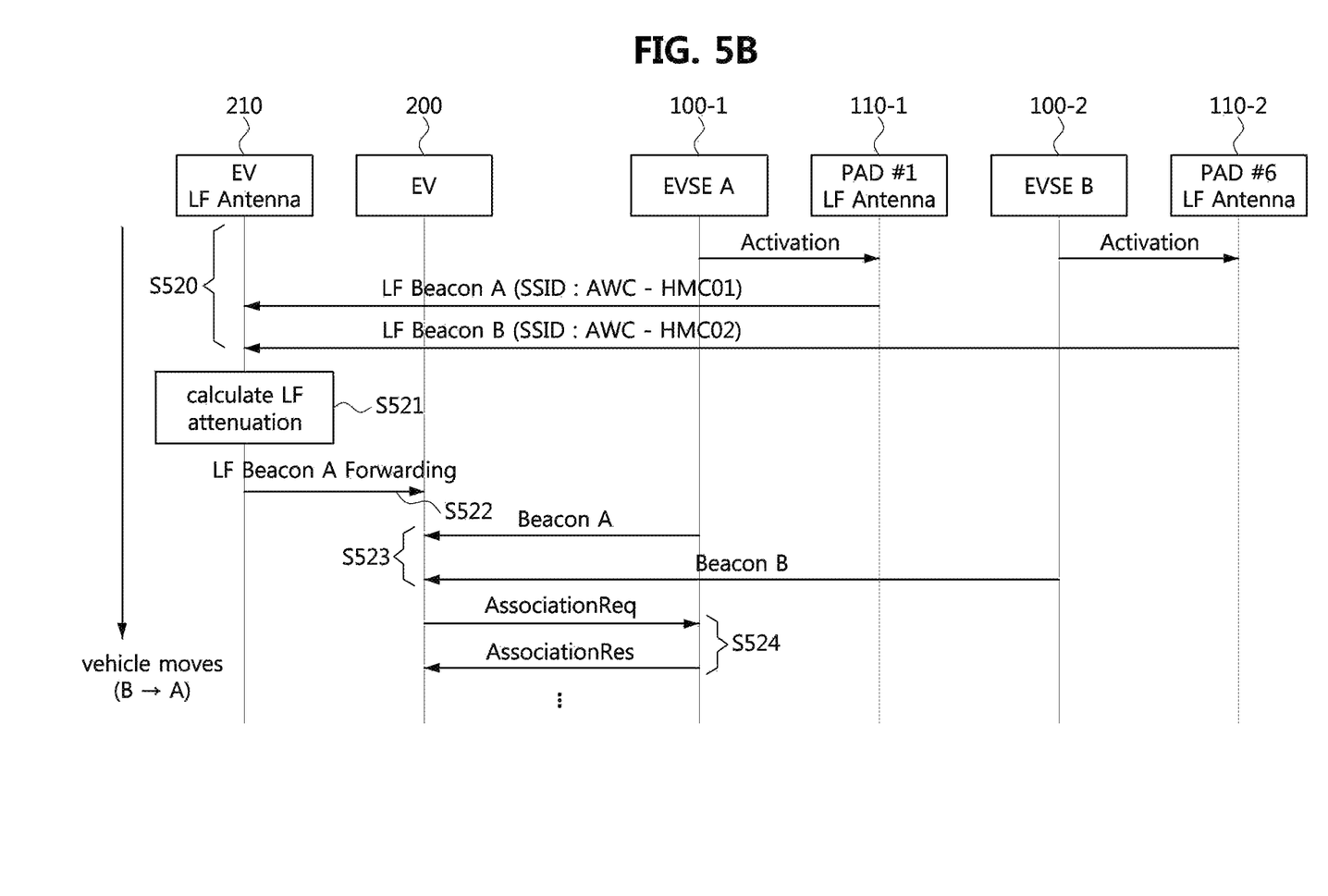

FIGS. 5A and 5B are sequence charts illustrating a communication association method between a vehicle and a charger according to another exemplary embodiment of the present disclosure.

The exemplary embodiment shown in FIGS. 5A and 5B shows a case where an association procedure between a vehicle and a charger is performed by passive scanning of a WLAN. In addition, it is assumed that the vehicle uses an LF antenna and that an LF beacon signal is periodically broadcast like an AP beacon.

It is assumed that the situation of the charging station is identical to that of the exemplary embodiment described with reference to FIGS. 4A and 4B. That is, as in the situation shown in FIG. 2, when the PAD #1 is controlled by the EVSE A and the PAD #6 is controlled by the EVSE B, the EVSE A and EVSE B, which detect that the vehicle enters the charging station, may activate the LF antenna 110-1 on the PAD #1 and the LF antenna 110-2 on the PAD #6, respectively. The LF antenna 110-1 on the PAD #1 may broadcast the LF beacon A, and the LF antenna 110-2 on the PAD #6 may broadcast the LF beacon B (S510). The LF antenna 210 of the EV having received the two LF beacons may calculate an LF attenuation value for each LF beacon (S511). Since the vehicle 200 at this time is located close to the PAD #6, the LF attenuation value of the LF beacon A, which is calculated at the LF antenna 210 of the EV, may be greater than the attenuation value of LF beacon B. Accordingly, the LF antenna of the EV may forward information on the LF beacon B to the EV 200 (S512).

The EV 200 may receive the information on the LF beacon B from the LF antenna 210, transmit an association request (i.e., AssociationReq) to the EVSE B based on the information included in a beacon (i.e., WLAN beacon B) transmitted by the EVSE B, receive a response (i.e., AssociationRes) from the EVSE B, and establish a connection with the EVSE B (S513, S514).

Meanwhile, as the vehicle moves from the PAD #6 to the PAD #1, the LF antenna 210 of EV may receive again the LF beacon A broadcast by the LF antenna 110-1 on the PAD #1 and the LF beacon B broadcast by the LF antenna 110-2 on the PAD #6 (S520). The LF antenna 210 of the EV having received the two LF beacons may calculate an LF attenuation value for each LF beacon (S521). Since the vehicle at this time is located close to the PAD #1, the LF attenuation value of the LF beacon B, which is calculated at the LF antenna 210 of the EV, may be greater than the attenuation value of the LF beacon A. Accordingly, the LF antenna of the EV may forward information on the LF beacon A to the EV (S522).

The EV 200 may receive the information on the LF beacon A from the LF antenna 210, transmit an association request (i.e., AssociationReq) to the EVSE A based on the information included in a beacon (i.e., WLAN beacon A) transmitted by the EVSE A, receive a response (i.e., AssociationRes) from the EVSE A, and establish a connection with the EVSE A (S523, S524).

Figure 6:
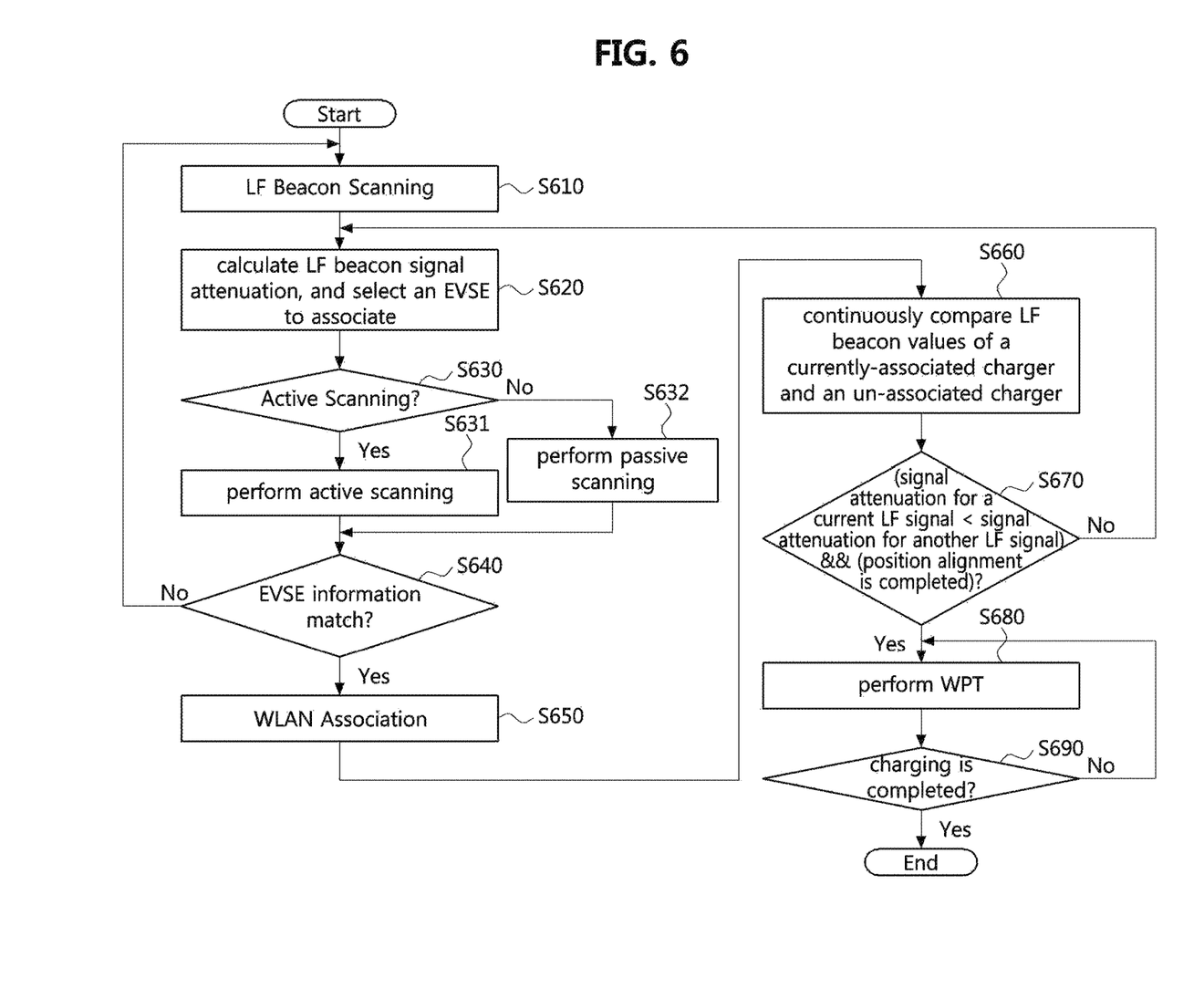
FIG. 6 is a flowchart illustrating a WPT method according to exemplary embodiments of the present disclosure.

FIG. 6 is a flowchart illustrating a WPT method according to exemplary embodiments of the present disclosure.

FIG. 6 shows an example of a WPT method performed by an EV, and through this, a sequence of a WPT method including an automatic association procedure between the EV and a charger for EV wireless charging can be confirmed. In the exemplary embodiment of FIG. 6, it is assumed that the EV uses an LF antenna.

When the EV enters a charging station for charging, the EV may scan an LF beacon transmitted by each charger (S610). In this case, the EV may identify an LF beacon of each charger sensor and store information on an EVSE related to the LF beacon. The EV may calculate a signal attenuation of the received LF beacon, and select an EVSE that controls a transmission pad having the minimum signal attenuation as an EVSE with which the EV establishes a communication connection (S620).

Thereafter, the EV may determine whether a scanning scheme related to EVSE scanning is active scanning or passive scanning (S630), and perform scanning according to the corresponding scheme. That is, when the EV performs active scanning, the EV may transmit and receive probe request/response with the corresponding EVSE (S631). On the other hand, when the EV performs passive scanning, the EV may receive a beacon (i.e., WLAN beacon) transmitted from the corresponding EVSE and store vendor specific element (VSE) information of the received beacon (S632).

The EV may confirm whether the EVSE information acquired through the LF beacon matches the EVSE information in the VSE acquired through the probe response or the beacon (i.e., WLAN beacon) from the EVSE (S640). If the two pieces of information do not match, the LF beacon scanning step S610 may be performed again. In this case, the mismatched EVSE may be excluded from a list for LF beacon rescanning to be performed later.

On the other, when the EVSE information acquired through the LF beacon and the EVSE information in the VSE acquired through the probe response or the beacon (i.e., WLAN beacon) from the EVSE, the EV may perform WLAN association (S650), and may continuously compare an LF beacon value of the currently-associated charger and an LF beacon value of a currently un-associated charger (S660). In this case, the comparison of a plurality of LF beacon values may be repeatedly performed until a position alignment sequence between the transmission and reception pads is completed.

That is, it may be determined whether an LF signal attenuation value from the currently associated charger is less than an LF signal attenuation value from another charger and whether the position alignment is completed (S670), and when both conditions are satisfied, the WPT to the EV may be performed (S680). The power transfer from the charger to the EV may be performed until charging is completed (S690). However, when the LF signal attenuation value from the currently associated charger is greater than or equal to the LF signal attenuation value from another charger, or when the position alignment is not completed, the step S620 and the subsequent procedure may be repeatedly performed.

Figure 7:
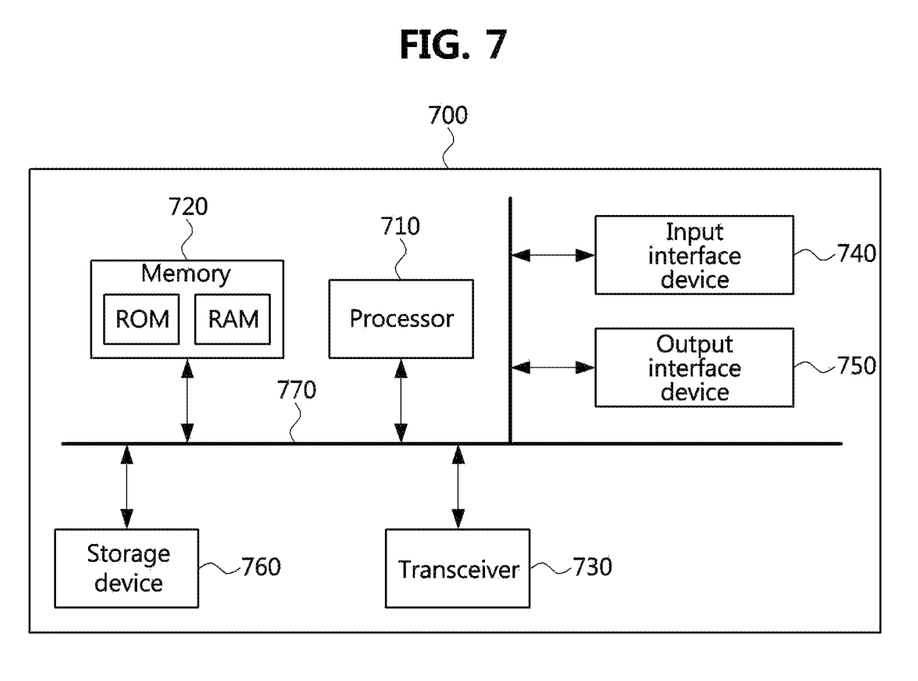
FIG. 7 is a block diagram of a communication establishment apparatus for WPT according to an exemplary embodiment of the present disclosure.

FIG. 7 is a block diagram of a communication establishment apparatus for WPT according to an exemplary embodiment of the present disclosure.

A communication establishment apparatus 700 for WPT shown in an exemplary embodiment shown in FIG. 7 may be included in the EV 200. The communication establishment apparatus 700 may include at least one processor 710, a memory 720 storing at least one instruction executable by the processor 710, and a transceiver 730 connected to a network to perform communication. In addition, the communication establishment apparatus 700 may further include an input interface device 740, an output interface device 750, a storage device 760, and the like. The components included in the communication establishment apparatus 700 may be connected by a bus 770 to communicate with each other.

The processor 710 may execute the at least one instruction stored in at least one of the memory 720 and the storage device 760. The processor 710 may refer to a central processing unit (CPU), a graphics processing unit (GPU), or a dedicated processor on which the methods according to the exemplary embodiments of the present disclosure are performed. Each of the memory 720 and the storage device 760 may be configured as at least one of a volatile storage medium and a nonvolatile storage medium. For example, the memory 720 may be configured with at least one of a read only memory (ROM) and a random access memory (RAM).

Here, the at least one instruction may cause the processor to: scan beacons broadcast in a low-level communication scheme from a plurality of chargers; select a beacon signal having a minimum signal attenuation by calculating signal attenuations for a plurality of scanned beacon signals; and establish a communication connection with an electric vehicle supply equipment (EVSE) associated with a charger transmitting the beacon signal having the minimum signal attenuation.

The low-level communication scheme may include a communication scheme using one or more among a low power excitation (LPE), a magnetic vectoring (MV), and a low frequency (LF) antenna, but is not limited thereto.

The beacon broadcast in the low-level communication scheme may include at least one of an application type indicating an application to which the beacon is applied, a sensor type indicating a type of a sensor implementing the low-level communication scheme, a service set identifier (SSID), and a pad identifier. The application type may indicate one of a communication matching between EV and EVSE, and an alignment between EV and EVSE. The sensor type may include at least one of an LF antenna, an MV, an LPE, and an ultra-wide band (UWB).

The selecting of the beacon signal may be repeatedly performed until a signal attenuation for a beacon signal transmitted by a currently-associated charger is equal to or less than a signal attenuation for a beacon signal transmitted by another charger, and a position alignment is completed.

In the establishing of the communication connection, the at least one instruction may further cause the processor to: transmit a probe request to the EVSE associated with the charger transmitting the beacon signal having the minimum signal attenuation, and receive a probe response in response to the probe request; and transmit an association request to the EVSE associated with the charger transmitting the beacon signal having the minimum signal attenuation, and receive an association response in response to the association request.

In the establishing of the communication connection, the at least one instruction may further cause the processor to: receive a wireless local area network (WLAN) beacon broadcast by the EVSE associated with the charger transmitting the beacon signal having the minimum signal attenuation; and transmit an association request to the EVSE based on information included in the WLAN beacon broadcast by the EVSE, and receive an association response in response to the association request.

According to the exemplary embodiments of the present disclosure, at a charging station in which a plurality of chargers are disposed, a vehicle can be smoothly associated with a charger that is to actually perform power transfer to the vehicle. In addition, according to the exemplary embodiments of the present disclosure, automatic association between an EV and a charger is made possible without a separate user intervention (e.g., communication establishment through an audio/video/navigation (AVN) system or user application (e.g., smartphone App)). In addition, according to the exemplary embodiment of the present disclosure, since the existing position alignment sensor of the wireless charging transmission/reception pad (PAD) is used, it is not necessary to separately configure additional hardware. In addition, the exemplary embodiment of the present disclosure may be implemented in a vehicle and a charger capable of wireless communication. In addition, the exemplary embodiment of the present disclosure may be implemented in a vehicle and a charger providing low-level communication modules. In addition, the exemplary embodiment of the present disclosure may be implemented in an autonomous vehicle capable of wireless charging.

The method according to the exemplary embodiments of the present disclosure may also be embodied as computer readable programs or codes on a computer readable recording medium. The computer readable recording medium is any data storage device that may store data which can be thereafter read by a computer system. The computer readable recording medium may also be distributed over network coupled computer systems so that the computer readable code is stored and executed in a distributed fashion.

In addition, examples of the computer-readable recording medium may include magnetic media such as hard discs, floppy discs, and magnetic tapes, optical media such as compact disc-read-only memories (CD-ROMs), digital video disc (DVDs), and so on, magneto-optical media such as floptical discs, and hardware devices specially configured (or designed) for storing and executing program commands, such as ROMs, random access memories (RAMs), flash memories, and so on. Examples of a program command may not only include machine language codes, which are created by a compiler, but may also include high-level language codes, which may be executed by a computer using an interpreter, and so on.

While some aspects of the present disclosure have been described in the context of an apparatus, the present disclosure may also represent a description according to a corresponding method, wherein the block or apparatus corresponds to a method step or a feature of the method step. Similarly, aspects described in the context of a method may also be represented by features of the corresponding block or item or corresponding device. Some or all of the method steps may be performed by (or using) a hardware device such as, for example, a microprocessor, a specifically programmed computer, or an electronic circuit. In various exemplary embodiments, one or more of the most important method steps may be performed by such an apparatus.

In exemplary embodiments, a programmable logic device (e.g., a field programmable gate array (FPGA)) may be used to perform some or all of the functions of the methods described herein. In addition, the FPGA may be configured to operate in conjunction with a microprocessor to perform one of the methods described herein. Generally, the methods are performed by some hardware device.

The foregoing description has been directed to exemplary embodiments of the present disclosure. It will be apparent, however, that other variations, substitutions and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A connection establishment method, performed by an electric vehicle (EV) being supplied power from a power supply device, the connection establishment method comprising:
scanning beacon broadcast in a low-level communication scheme from a plurality of chargers;
calculating signal attenuations for a plurality of scanned beacon signals;
selecting an electric vehicle supply equipment (EVSE) associated with a charger of the plurality of chargers that transmits a first beacon signal having the minimum signal attenuation;
confirming whether a first EVSE information acquired through the first beacon signal matches a second EVSE information in a vendor specific element (VSE) information acquired through a probe response with the selected EVSE or a wireless local area network (WLAN) beacon from the selected EVSE;
establishing a communication connection with the selected EVSE when the first and second EVSE information are matched;
after establishing the communication connection with the selected EVSE, comparing signal attenuation of the first beacon signal with a signal attenuation of a second beacon signal of the plurality of beacon signals transmitted by another charger of the plurality of chargers associated with another EVSE with which a communication connection has not been established; and
determining whether the signal attenuation value of the first beacon signal is lower than the signal attenuation value of the second beacon signal and whether a position alignment for wireless power transfer of the EV is completed;
wherein the calculating, selecting, confirming, establishing, comparing, and determining are repeated when the signal attenuation value of the first beacon signal is greater than or equal to the signal attenuation value of the second beacon signal or when the position alignment is not completed.

2. The connection establishment method according to claim 1, wherein the scanning of the beacon broadcast in the low-level communication scheme comprises scanning the beacon broadcast in a communication scheme using at least one of a low power excitation (LPE), a magnetic vectoring (MV), or a low frequency (LF) antenna.

3. The connection establishment method according to claim 1, wherein the scanning of the beacon broadcast in the low-level communication scheme comprises scanning the beacon broadcast in the low-level communication scheme that includes at least one of an application type indicating an application to which the beacon is applied, a sensor type indicating a type of a sensor implementing the low-level communication scheme, a service set identifier (SSID), and a pad identifier.

4. The connection establishment method according to claim 3, wherein the application type includes one of a communication matching between EV and EVSE, or an alignment between EV and EVSE.

5. The connection establishment method according to claim 3, wherein the sensor type includes at least one of an LF antenna, an MV, an LPE, or an ultra-wide band (UWB).

6. The connection establishment method according to claim 1, wherein power transfer is performed from the charger associated with the selected EVSE to the EV when the signal attenuation for the first beacon signal is less than the signal attenuation for the second beacon signal transmitted by the another charger, and the position alignment is completed.

7. The connection establishment method according to claim 1, wherein the establishing of the communication connection comprises:
  transmitting a probe request to the EVSE associated with the charger and receiving the probe response in response to the probe request; and
  transmitting an association request to the EVSE associated with the charger and receiving an association response in response to the association request.

8. The connection establishment method according to claim 1, wherein the establishing of the communication connection comprises:
  receiving a wireless local area network (WLAN) beacon broadcast by the EVSE associated with the charger; and
  transmitting an association request to the EVSE based on information included in the WLAN beacon broadcast, and receiving an association response in response to the association request.

9. A communication establishment apparatus of an electric vehicle (EV) being supplied power from a power supply device, the communication establishment apparatus comprising:
  a processor; and
  a memory configured to store processor-readable instructions that, when executed by the processor, cause the processor to:
    scan beacon broadcast in a low-level communication scheme from a plurality of chargers;
    calculate signal attenuations for a plurality of scanned beacon signals;
    select an electric vehicle supply equipment (EVSE) associated with a charger of the plurality of chargers that transmits a first beacon signal having the minimum signal attenuation;
    confirm weather a first EVSE information acquired through the first beacon signal matches a second EVSE information in a vendor specific element (VSE) information acquired through a probe response with the selected EVSE or a wireless local area network (WLAN) beacon from the selected EVES;
    establish a communication connection with the selected EVSE when the first and second EVSE information are matched;
    after establishment of the communication connection with the selected EVSE, compare the signal attenuation of the first beacon signal with a signal attenuation of a second beacon signal of the plurality of beacon signals transmitted by another charger of the plurality of chargers associated with another EVSE with which a communication connection has not been established; and
    determine weather the signal attenuation value of the first beacon signal is lower than the signal attenuation value of the second beacon signal and whether a position alignment for wireless power transfer of the EV is completed;
  wherein the calculation, selection, confirmation, establishment, comparison, and determination are repeated when the signal attenuation value of the first beacon signal is greater than or equal to the signal attenuation value of the second beacon signal or when the position alignment is not completed.

10. The communication establishment apparatus according to claim 9, wherein the processor is configured to:
  scan the beacon broadcast in a communication scheme using at least one of a low power excitation (LPE), a magnetic vectoring (MV), or a low frequency (LF) antenna.

11. The communication establishment apparatus according to claim 9, wherein the processor is configured to:
  scan the beacon broadcast in the low-level communication scheme that includes at least one of an application type indicating an application to which the beacon is applied, a sensor type indicating a type of a sensor implementing the low-level communication scheme, a service set identifier (SSID), and a pad identifier.

12. The communication establishment apparatus according to claim 11, wherein the application type includes one of a communication matching between EV and EVSE, or an alignment between EV and EVSE.

13. The communication establishment apparatus according to claim 11, wherein the sensor type includes at least one of an LF antenna, an MV, an LPE, or an ultra-wide band (UWB).

14. The communication establishment apparatus according to claim 9, wherein the processor is configured to:
  command the charger associated with the selected EVSE to perform power transfer to the EV when the signal attenuation for the first beacon signal is less than the signal attenuation for the second beacon signal transmitted by the another charger, and the position alignment is completed.

15. The communication establishment apparatus according to claim 9, wherein, when establishing the communication connection, the processor is configured to:
  transmit a probe request to the EVSE associated with the charger and receive a probe response in response to the probe request; and
  transmit an association request to the EVSE associated with the charger and receive an association response in response to the association request.

16. The communication establishment apparatus according to claim 9, wherein, when establishing the communication connection, the processor is configured to:
  receive a wireless local area network (WLAN) beacon broadcast by the EVSE associated with the charger; and
  transmit an association request to the EVSE based on information included in the WLAN beacon broadcast and receive an association response in response to the association request.

* * * * *